US012376211B2

(12) United States Patent
Tang et al.

(10) Patent No.: US 12,376,211 B2
(45) Date of Patent: Jul. 29, 2025

(54) THREE LEVEL SWITCHING CONVERTER AND CONTROL

(71) Applicant: Texas Instruments Incorporated, Dallas, TX (US)

(72) Inventors: Yichao Tang, Shanghai (CN); Yan He, Shanghai (CN); Sombuddha Chakraborty, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/522,369

(22) Filed: Nov. 29, 2023

(65) Prior Publication Data

US 2025/0176083 A1 May 29, 2025

(51) Int. Cl.
*H05B 45/38* (2020.01)
*H05B 45/335* (2020.01)

(52) U.S. Cl.
CPC ........... *H05B 45/38* (2020.01); *H05B 45/335* (2020.01)

(58) Field of Classification Search
CPC ...... H05B 45/37; H05B 45/38; H05B 45/325; H05B 45/335; H05B 45/3725; H02M 3/158; H02M 3/1582; H02M 3/1584
See application file for complete search history.

(56) References Cited

U.S. PATENT DOCUMENTS

| | | | | |
|---|---|---|---|---|
| 2017/0250607 A1* | 8/2017 | Zhak | ........................ | H02M 1/32 |
| 2021/0313892 A1* | 10/2021 | Kim | ........................ | H02M 3/06 |
| 2022/0393594 A1* | 12/2022 | Han | ...................... | H02M 3/157 |
| 2024/0258925 A1* | 8/2024 | Tang | ...................... | H02M 3/076 |
| 2024/0305194 A1* | 9/2024 | Anderson | ............ | H02M 3/157 |

* cited by examiner

*Primary Examiner* — Tung X Le

(74) *Attorney, Agent, or Firm* — Valerie M. Davis; Frank D. Cimino

(57) ABSTRACT

A circuit includes first, second third, and fourth transistors coupled in series, and a control circuit coupled to the first, second, third, and fourth transistors. The control circuit includes a clock generator, a current sense circuit, and a zero current differentiation zone (ZC_DF) circuit. The clock generator is configured to generate first and second clocks. The second clock is in quadrature with the first clock. The current sense circuit is configured to sense a current flowing through the first transistor. The ZC_DF circuit is configured to define a ZC_DF interval starting at an edge of the second clock and ending at turn-on of the fourth transistor. The control circuit is configured to operate the first, second, third, and fourth transistors in a discontinuous conduction mode (DCM), and, in DCM, turn off the first transistor during the ZC_DF interval responsive to the current flowing through the first transistor being negative.

20 Claims, 8 Drawing Sheets

THREE LEVEL SWITCHING CONVERTER AND CONTROL

BACKGROUND

A DC-DC converter is an electronic circuit that converts an input direct current (DC) voltage into one or more DC output voltages that are higher or lower in magnitude than the input DC voltage, A DC-DC converter that generates an output voltage lower than the input voltage is termed a buck or step-down converter. A DC-DC converter that generates an output voltage higher than the input voltage is termed a boost or step-up converter.

Some DC-DC converter topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal DC-DC converters are widely used in electronic devices, particularly battery powered devices, such as portable cellular phones, laptop computers, and other electronic systems in which efficient use of power is desirable.

SUMMARY

In one example, a circuit includes first, second, third, and fourth transistors, and a control circuit. The first, second, third, and fourth transistors are coupled in series. The control circuit is coupled to the first, second, third, and fourth transistors. The control circuit includes a clock generator, a current sense circuit, and a zero current differentiation zone (ZC_DF) circuit. The clock generator is configured to generate first and second clocks. The second clock is in quadrature with the first clock. The current sense circuit is configured to sense a current flowing through the first transistor. The ZC_DF circuit is configured to define a ZC_DF interval starting at an edge of the second clock and ending at turn-on of the fourth transistor. The control circuit is configured to operate the first, second, third, and fourth transistors in a discontinuous conduction mode (DCM), and, in DCM, turn off the first transistor during the ZC_DF interval responsive to the current flowing through the first transistor being negative.

In another example, a circuit includes first, second, third, and fourth transistors, and a control circuit. The first, second, third, and fourth transistors are coupled in series. The control circuit is coupled to the first, second, third, and fourth transistors. The control circuit includes a clock generator, a first current sense circuit, and a second current sense circuit. The clock generator is configured to generate first and second clocks. The second clock is in quadrature with the first clock. The first current sense circuit is configured to sense a current flowing through the first transistor. The second current sense circuit is configured to sense a current flowing through the fourth transistor. The control circuit is configured to operate the first, second, third, and fourth transistors in a pulse frequency modulation (PFM) mode, and define a pre-PFM zone based on the current flowing through the fourth transistor being zero at an edge of the second clock. In the pre-PFM zone, the control circuit is configured to disable turn-on of the fourth transistor, and exit the pre-PFM zone responsive to the current flowing through the fourth transistor not being zero at an edge of the second clock.

In a further example, a backlight system includes a light emitting diode (LED) and a three-level switching converter. The three-level switching converter is coupled to the LED. The three-level switching converter includes first, second, third, and fourth transistors and a control circuit. The first, second, third, and fourth transistors are coupled in series. The control circuit is coupled to the first, second, third, and fourth transistors. The control circuit includes a clock generator, a first current sense circuit, a second current sense circuit, and a zero current differentiation zone (ZC_DF) circuit. The clock generator is configured to generate first and second clocks. The second clock is in quadrature with the first clock. The first current sense circuit is configured to sense a current flowing through the first transistor. The ZC_DF circuit is configured to define a ZC_DF interval starting at an edge of the second clock and ending at turn-on of the fourth transistor. The control circuit is configured to operate the first, second, third, and fourth transistors in a discontinuous conduction mode (DCM). In DCM, the controller is configured to turn off the first transistor during the ZC_DF interval responsive to the current flowing through the first transistor being negative, and turn off the second transistor during the ZC_DF interval responsive to the current flowing through the fourth transistor being negative.

DETAILED DESCRIPTION

Figure 1:
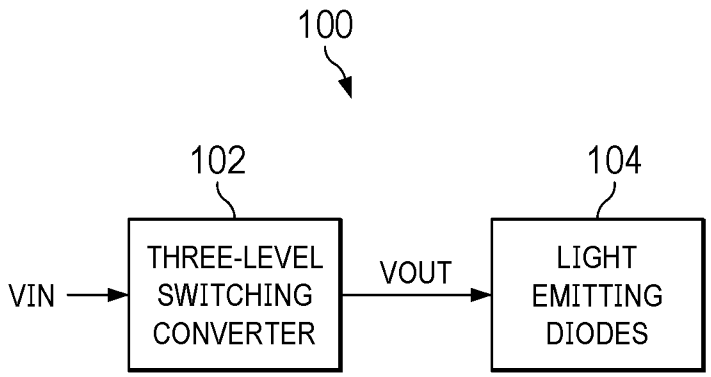
FIG. 1 is a block diagram of an example backlight system that includes a three level boost converter.

FIG. 1 is a block diagram of an example backlight system 100. The backlight system 100 may be applied in a liquid crystal display (LCD) system to provide the light emitted from the display. The backlight system 100 may also be applied in other lighting applications. The backlight system 100 includes a three-level switching converter 102 and light emitting diodes (LEDs) 104. The LEDs 104 may include any number of LEDs arranged in series and/or in parallel to emit light behind an LCD panel. For example, strings of LEDs coupled in series may be coupled in parallel to form a two-dimensional array of LEDs.

The three-level switching converter 102 may provide a number of advantages over a two-level converter. Three-level converters produce an output voltage in two voltage steps (three levels—the input voltage, an intermediate voltage, and the output voltage), rather than the single voltage step (two levels—the input voltage and the output voltage) used in two-level converters. Producing the output voltage in two steps can reduce the voltage across the switching devices, which can enable use of smaller, lower voltage devices and provide improved efficiency. Compared to a two-level boost converter, the three-level switching converter 102 may be more complex (with more switching devices to control), but may provide higher efficiency, higher boost ratio, lower electromagnetic interference, and/or smaller overall size, but The LEDs 104 are coupled to the three-level switching converter 102. The three-level switching converter 102 provides power (VOUT) to forward bias the LEDs 104. The three-level switching converter 102 may be a three-level boost converter that provides a wide boost ratio for use with a wide range of input voltage (VIN). For example, the three-level switching converter 102 may operate with a VIN in a range of 3V volts to 24 volts for use with various power sources (a battery, universal serial bus, etc.).

To provide efficient operation over a wide range of loading, the three-level switching converter 102 can operate in continuous conduction mode (CCM), discontinuous conduction mode (DCM), or pulse frequency modulation (PFM) mode. Control of switching in DCM and PFM presents a number of challenges in three-level boost converters. For example, in DCM, improper synchronous rectifier control can increase rectifier loss. PFM operation zones differ across a wide VIN range, and improper control can increase switching loss. The three-level switching converter 102 controls DCM operation to reduce rectifier loss, and controls PFM operation to reduce switching loss.

Figure 2:
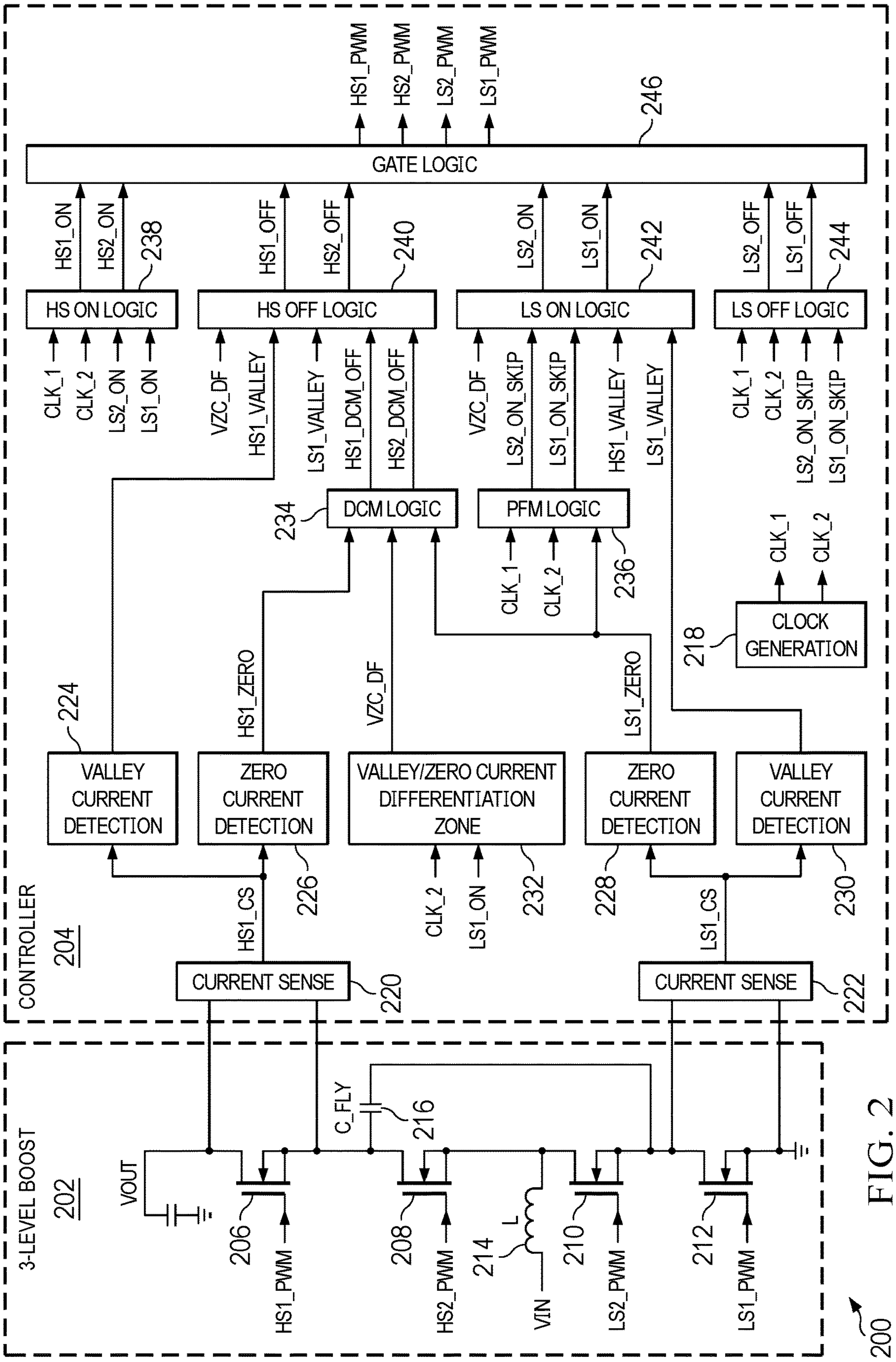
FIG. 2 is a block diagram of an example three-level boost converter that includes light load control circuitry.

FIG. 2 is a block diagram of an example three-level boost converter 200 that includes light load control circuitry. The three-level boost converter 200 is an example of the three-level switching converter 102. The three-level boost converter 200 includes a power stage 202 and a controller 204 (also referred to as a control circuit). The power stage 202 includes transistors 206, 208, 210, and 212 coupled in series, and a capacitor 216. The transistors 206, 208, 210, and 212 may be n-type field effect transistors (NFETs). A first current terminal (e.g., drain) of the transistor 206 is coupled to an output terminal for provision of VOUT to external circuitry (e.g., the LEDs 104). A second current terminal (e.g., source) of the transistor 206 is coupled to a first current terminal (e.g., drain) of the transistor 208. A second current terminal (e.g., source) of the transistor 208 is coupled to a first current terminal (e.g., drain) of the transistor 210. A second current terminal (e.g., source) of the transistor 210 is coupled to a first current terminal (e.g., drain) of the transistor 212. A second current terminal (e.g., source) of the transistor 212 is coupled to a reference voltage terminal (e.g., ground).

The capacitor 216 is coupled across the transistor 208 and the transistor 210. A first terminal (e.g., top plate) of the capacitor 216 is coupled to the first current terminal of the transistor 208, and a second terminal (e.g., bottom plate) of the capacitor 216 is coupled to the second current terminal of the transistor 210.

An inductor 214 is coupled between an input voltage terminal and the second current terminal of the transistor 208. The inductor 214 may be provided external to the power stage 202, while the power stage 202 and the controller 204 may be provided as an integrated circuit. The transistors 206, 208, 210, and 212 are turned on or off to charge or discharge the inductor 214 and the capacitor 216, and generate VOUT.

The transistors 206, 208, 210, and 212 have control terminals (e.g., gates) that are coupled to the controller 204. The controller 204 controls turn on and turn off of the transistors 206, 208, 210, and 212 to generate VOUT from VIN as four distinct states. In state 1, the controller 204 turns on the transistor 210 and the transistor 212, and turns off the transistor 206 and the transistor 208 to charge the inductor 214. In state 2, the controller 204 turns on the transistor 208 and the transistor 212, and turns off the transistor 206 and the transistor 210 to charge the capacitor 216. In state 3, the controller 204 turns on the transistor 206 and the transistor 210, and turns off the transistor 208 and the transistor 212 to discharge the capacitor 216. In state 4, the controller 204 turns on the transistor 206 and the transistor 208, and turns off the transistor 210 and the transistor 212 to discharge the inductor 214. These states will be further illustrated in FIGS. 3, 4, 5, and 6.

The controller 204 includes a clock generation circuit 218, current sense circuits 220 and 222, valley current detection circuits 224 and 230, zero current detection circuits 226 and 228, a valley/zero current differentiation zone circuit 232, DCM control circuit 234, PFM control circuit 236, high-side on circuit 238, high-side off circuit 240, low-side on circuit 242, low-side off circuit 244, and gate control circuit 246. The gate control circuit 246 has outputs coupled to the control terminals of the transistors 206, 208, 210, and 212, and generates signals HS1_PWM, HS2_PWM, LS1_PWM, and LS2_PWM to control turn-on and turn-off of the transistors 206, 208, 210, and 212. The gate control circuit 246 may include level shifting, drive, and signal generating circuitry to produce the signals HS1_PWM, HS2_PWM, LS1_PWM, and LS2_PWM based on the on/off control signals received from the high-side on circuit 238, the high-side off circuit 240, the low-side on circuit 242, and the low-side off circuit 244.

The high-side on circuit 238 is coupled to the gate control circuit 246. The high-side on circuit 238 provides control signals HS1_ON and HS2_ON to the gate control circuit 246 for turning on the transistor 206 and the transistor 208, respectively. The high-side on circuit 238 generates HS1_ON and HS2_ON based on the clock signals CLK_1 and CLK_2 received from the clock generation circuit 218, and signals LS1_ON and LS2_ON received from the low-side on circuit 242. The logic implemented by circuitry of the high-side on circuit 238 will be explained using FIGS. 3-9.

The high-side off circuit 240 is coupled to the gate control circuit 246. The high-side off circuit 240 provides control signals HS1_OFF and HS2_OFF to the gate control circuit 246 for turning off the transistor 206 and the transistor 208, respectively. The high-side off circuit 240 generates HS1_OFF and HS2_OFF based on the signal VZC_DF received from the valley/zero current differentiation zone circuit 232, the signal HS1_VALLEY received from the valley current detection circuit 224, the signal LS1_VALLEY received from the valley current detection circuit 230, and the signals HS1_DCM_OFF and HS2_DCM_OFF received from the DCM control circuit 234. The logic implemented by circuitry of the high-side on circuit 238 will be explained using FIGS. 3-9.

The low-side on circuit 242 is coupled to the gate control circuit 246. The low-side on circuit 242 provides control signals LS1_ON and LS2_ON to the gate control circuit 246 for turning on the transistor 210 and the transistor 212, respectively. The low-side on circuit 242 generates LS1_ON and LS2_ON based on the signal VZC_DF received from the valley/zero current differentiation zone circuit 232, the signal HS1_VALLEY received from the valley current detection circuit 224, the signal LS1_VALLEY received from the valley current detection circuit 230, and the signals LS1_ON_SKIP and LS2_ON_SKIP received from the PFM control circuit 236. The logic implemented by circuitry of the low-side on circuit 242 will be explained using FIGS. 3-9.

The low-side off circuit 244 is coupled to the gate control circuit 246. The low-side off circuit 244 provides control signals LS1_OFF and LS2_OFF to the gate control circuit 246 for turning off the transistor 210 and the transistor 212, respectively. The low-side off circuit 244 generates LS1_OFF and LS2_OFF based on the clock signals CLK_1 and CLK_2 received from the clock generation circuit 218, and signals LS1_ON_SKIP and LS2_ON_SKIP received from the PFM control circuit 236. The logic implemented by circuitry of the low-side off circuit 244 will be explained using FIGS. 3-9.

The DCM control circuit 234 is coupled to the high-side off circuit 240. The DCM control circuit 234 generates the signals HS1_DCM_OFF and HS2_DCM_OFF based on the signal HS1_ZERO, the signal LS1_ZERO, and the signal VZC_DF received from the valley/zero current differentiation zone circuit 232. The logic implemented by circuitry of the DCM control circuit 234 will be explained using FIGS. 5-6.

The PFM control circuit 236 is coupled to the low-side on circuit 242 and the low-side off circuit 244. The PFM control circuit 236 generates the signals LS1_ON_SKIP and LS2_ON_SKIP based on the clock signals CLK_1 and CLK_2 received from the clock generation circuit 218, and the signal LS1_ZERO received from the zero current detection circuit 228. The logic implemented by circuitry of the PFM control circuit 236 will be explained using FIG. 9.

The valley/zero current differentiation zone circuit 232 is coupled to the DCM control circuit 234. The valley/zero current differentiation zone circuit 232 generates the signal VZC_DF based on the clock signal CLK_2 received from the clock generation circuit 218, and the signal LS1_ON received from the low-side on circuit 242. The logic implemented by circuitry of the valley/zero current differentiation zone circuit 232 will be explained using FIGS. 5 and 6.

The current sense circuit 220 is coupled across the transistor 206. A first terminal of the current sense circuit 220 is coupled to the first current terminal of the transistor 206, and a second terminal of the current sense circuit 220 is coupled to the second current terminal of the transistor 206. The current sense circuit 220 senses the current flowing through the transistor 206, for example, senses current based on the voltage across the transistor 206. The current sense circuit 220 generates the signal HS1_CS, which is representative of the current flowing through the transistor 206.

The valley current detection circuit 224 is coupled to the current sense circuit 220. The valley current detection circuit 224 detects a valley in the current flowing through the transistor 206 based on HS1_CS. The signal HS1_VALLEY represents detection of a valley in the current flowing through the transistor 206. The valley current detection circuit 224 may include a comparator that compares HS1_CS to a valley current threshold to detect the valley current.

The zero current detection circuit 226 is coupled to the current sense circuit 220. The zero current detection circuit 226 detects zero current flowing through the transistor 206 based on HS1_CS. The signal HS1_ZERO represents detection of zero current flowing through the transistor 206. The valley current detection circuit 224 may include a comparator that compares HS1_CS to a zero current threshold to detect the zero current.

The current sense circuit 222 is coupled across the transistor 212. A first terminal of the current sense circuit 222 is coupled to the first current terminal of the transistor 212, and a second terminal of the current sense circuit 222 is coupled to the second current terminal of the transistor 212. The current sense circuit 222 senses the current flowing through the transistor 212, for example, based on the voltage across the transistor 212. The current sense circuit 222 generates the signal LS1_CS, which is representative of the current flowing through the transistor 212.

The valley current detection circuit 230 is coupled to the current sense circuit 222. The valley current detection circuit 230 detects a valley in the current flowing through the transistor 212 based on LS1_CS. The signal LS1_VALLEY represents detection of a valley in the current flowing through the transistor 212. The valley current detection circuit 230 may include a comparator that compares LS1_CS to a valley current threshold to detect the valley current.

The zero current detection circuit 228 is coupled to the current sense circuit 220. The zero current detection circuit 228 detects zero current flowing through the transistor 212 based on LS1_CS. The signal LS1_ZERO represents detection of zero current flowing through the transistor 212. The zero current detection circuit 228 may include a comparator that compares LS1_CS to a zero current threshold to detect the zero current.

The clock generation circuit 218 generates the clock signals CLK_1 and CLK_2 as sawtooth or ramp signals at a fixed frequency (e.g., a selected switching frequency of the 200). CLK_1 and CLK_2 have the same frequency, and CLK_2 is shifted in phase by 90° with respect to CLK_1. CLK_1 and CLK_2 are in quadrature (shifted in phase by 90° with respect to one another).

Figure 3:
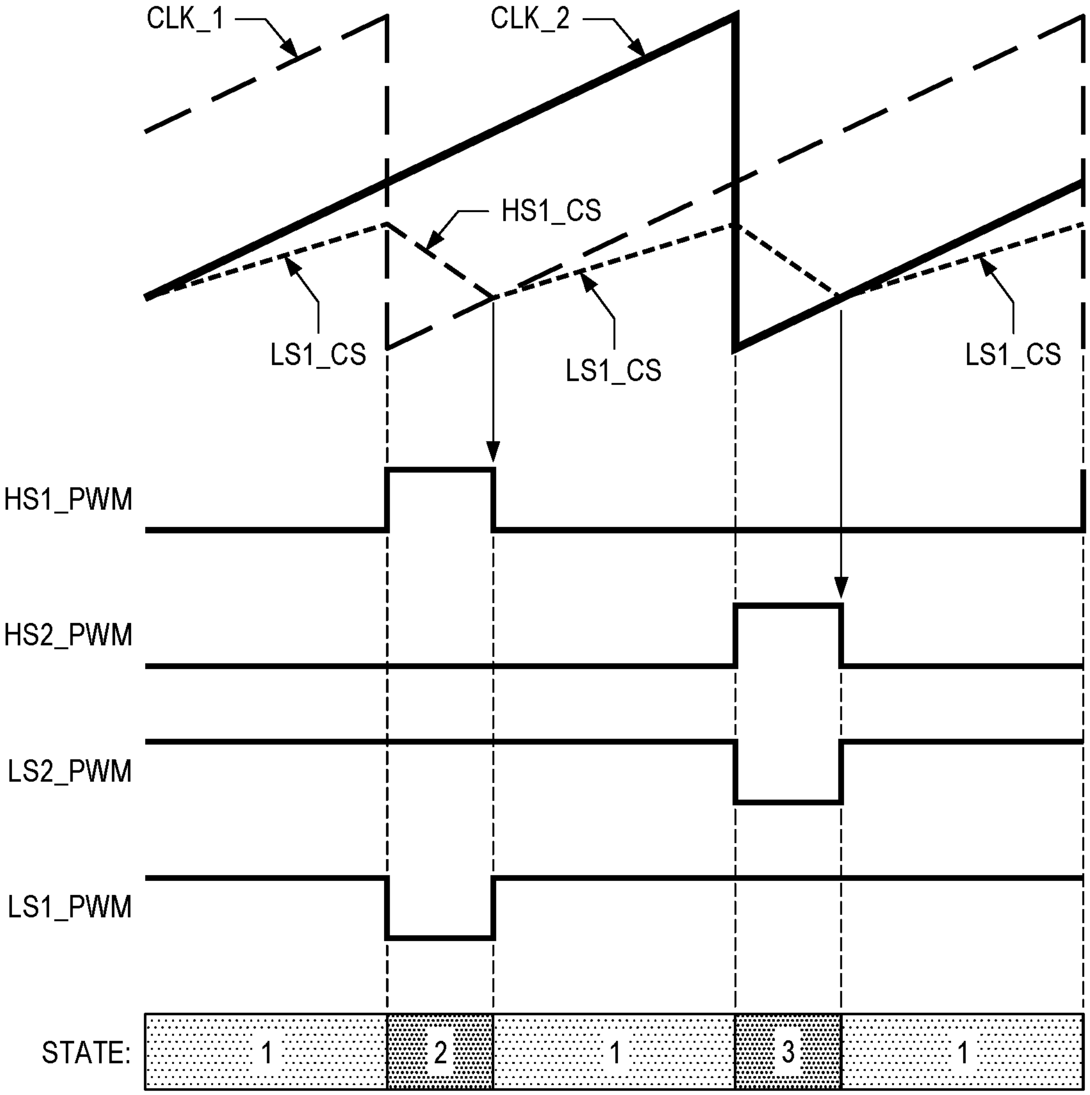
FIG. 3 is a timing diagram illustrating example operation of the three-level boost converter of FIG. 2 in continuous conduction mode (CCM) with a low input voltage.

FIG. 3 is a timing diagram illustrating example operation of the three-level boost converter 200 in CCM with a low input voltage. A low input voltage refers to an input voltage VIN that is less than half of VOUT. A high input voltage refers to an input voltage VIN that is greater than half of VOUT. FIG. 3 shows the clock signals CLK_1 and CLK_2, the current sense signals HS1_CS and LS1_CS, and the transistor control signals HS1_PWM, HS2_PWM, LS1_PWM, and LS2_PWM. The transistor control signals HS1_PWM, HS2_PWM, LS1_PWM, and LS2_PWM control turn on/off of the transistors 206, 208, 210, and 212 respectively.

At the falling edge of CLK_1, (initiation of state 2) the high-side on circuit 238 sets HS1_ON to a logic one, which sets HS1_PWM to a logic one, and turns on the transistor 206. Similarly, at the falling edge of CLK_1, the low-side off circuit 244 sets LS1_OFF to a logic one, which sets LS1_PWM to a logic zero, and turns off the transistor 212. With the transistor 206 turned on, the valley current detection circuit 224 monitors the current flowing through the transistor 206 to detect a valley. When a valley is detected (initiation of state 1 after state 2), the high-side off circuit 240 sets the HS1_OFF to a logic one, which sets HS1_PWM to a logic zero and turns off the transistor 206. Similarly, when the valley is detected, the low-side on circuit 242 sets LS1_ON to a logic one, which sets LS1_PWM to a logic one and turns on the transistor 212.

At the falling edge of CLK_2, (initiation of state 3) the high-side on circuit 238 sets HS2_ON to a logic one, which sets HS2_PWM to a logic one, and turns on the transistor 208. Similarly, at the falling edge of CLK_2, the low-side off circuit 244 sets LS2_OFF to a logic one, which sets LS2_PWM to a logic zero, and turns off the transistor 210. With the transistor 208 turned on, the valley current detection circuit 230 monitors the current flowing through the transistor 212 to detect a valley. When a valley is detected (initiation of state 1 after state 3), the high-side off circuit 240 sets HS2_OFF to a logic one, which sets HS2_PWM to a logic zero and turns off the transistor 208. Similarly, when the valley is detected, the low-side on circuit 242 sets LS2_ON to a logic one, which sets LS2_PWM to a logic one and turns on the transistor 210.

Accordingly, in CCM, with a low input voltage, the three-level boost converter 200 transitions between states as 1, 2, 1, 3 to generate VOUT.

Figure 4:
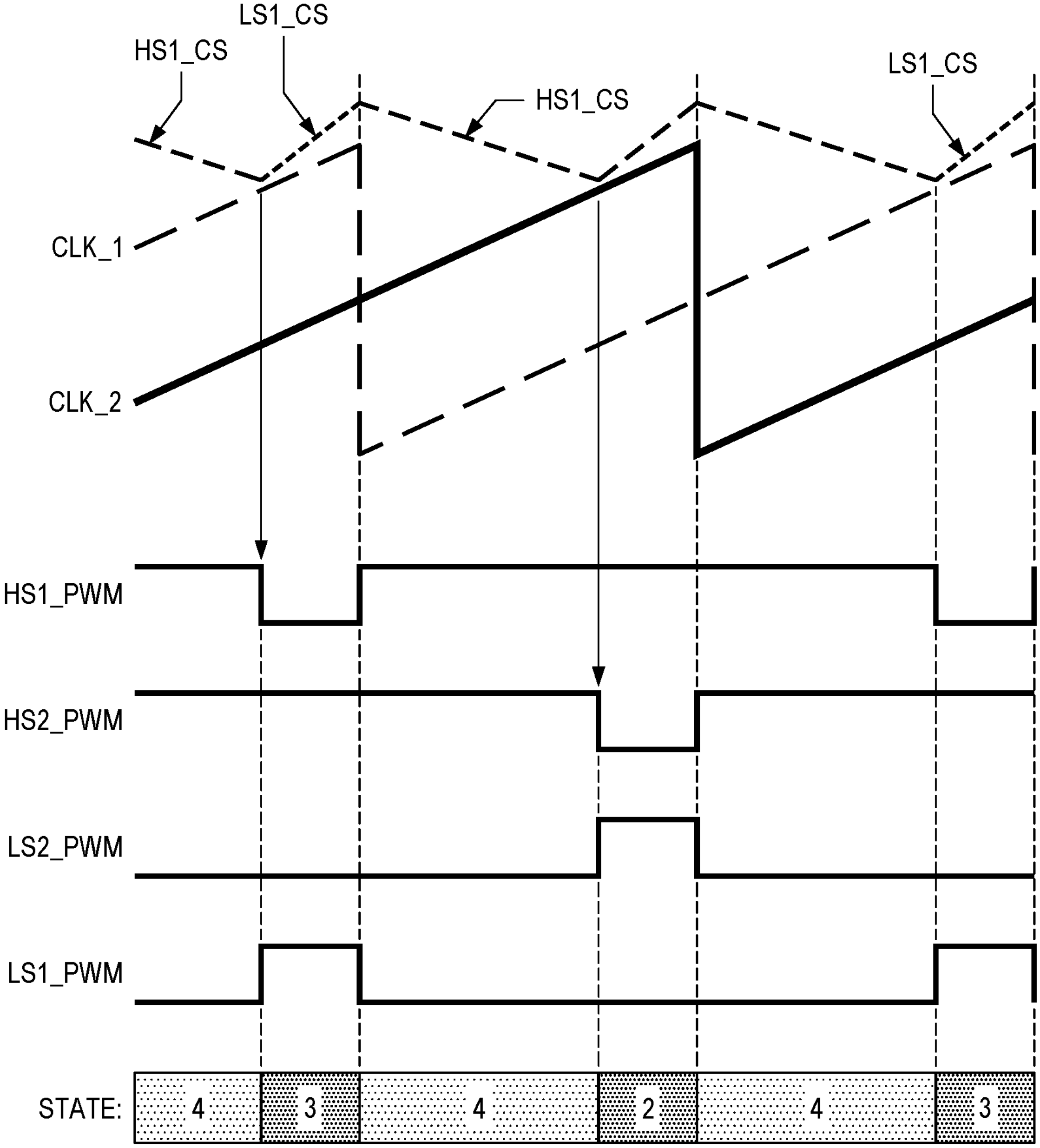
FIG. 4 is a timing diagram illustrating example operation of the three-level boost converter of FIG. 2 in CCM with a high input voltage.

FIG. 4 is a timing diagram illustrating example operation of the three-level boost converter 200 in CCM with a high input voltage. FIG. 4 shows the clock signals CLK_1 and CLK_2, the current sense signals HS1_CS and LS1_CS, and the transistor control signals HS1_PWM, HS2_PWM, LS1_PWM, and LS2_PWM. The transistor control signals HS1_PWM, HS2_PWM, LS1_PWM, and LS2_PWM control turn on/off of the transistors 206, 208, 210, and 212 respectively.

At the falling edge of CLK_1, (initiation of state 4 after state 3) the high-side on circuit 238 sets HS1_ON to a logic one, which sets HS1_PWM to a logic one, and turns on the transistor 206. Similarly, at the falling edge of CLK_1, the low-side off circuit 244 sets LS1_OFF to a logic one, which sets LS1_PWM to a logic zero, and turns off the transistor 212. With the transistor 206 turned on, the valley current detection circuit 224 monitors the current flowing through the transistor 206 to detect a valley. When a valley is detected (initiation of state 2), the high-side off circuit 240 sets the HS2_OFF to a logic one, which sets HS2_PWM to a logic zero and turns off the transistor 208. Similarly, when the valley is detected, the low-side on circuit 242 sets LS2_ON to a logic one, which sets LS2_PWM to a logic one and turns on the transistor 210.

At the falling edge of CLK_2, (initiation of state 4 after state 2) the high-side on circuit 238 sets HS2_ON to a logic one, which sets HS2_PWM to a logic one, and turns on the transistor 208. Similarly, at the falling edge of CLK_2, the low-side off circuit 244 sets LS2_OFF to a logic one, which sets LS2_PWM to a logic zero, and turns off the transistor 210. The valley current detection circuit 224 is monitoring the current flowing through the transistor 206 to detect a valley. When a valley is detected (initiation of state 3), the high-side off circuit 240 sets HS1_OFF to a logic one, which sets HS1_PWM to a logic zero and turns off the transistor 206. Similarly, when the valley is detected, the low-side on circuit 242 sets LS1_ON to a logic one, which sets LS1_PWM to a logic one and turns on the transistor 212.

Accordingly, in CCM, with a high input voltage, the three-level boost converter 200 transitions between states as 2, 4, 3, 4 to generate VOUT.

Figure 5:
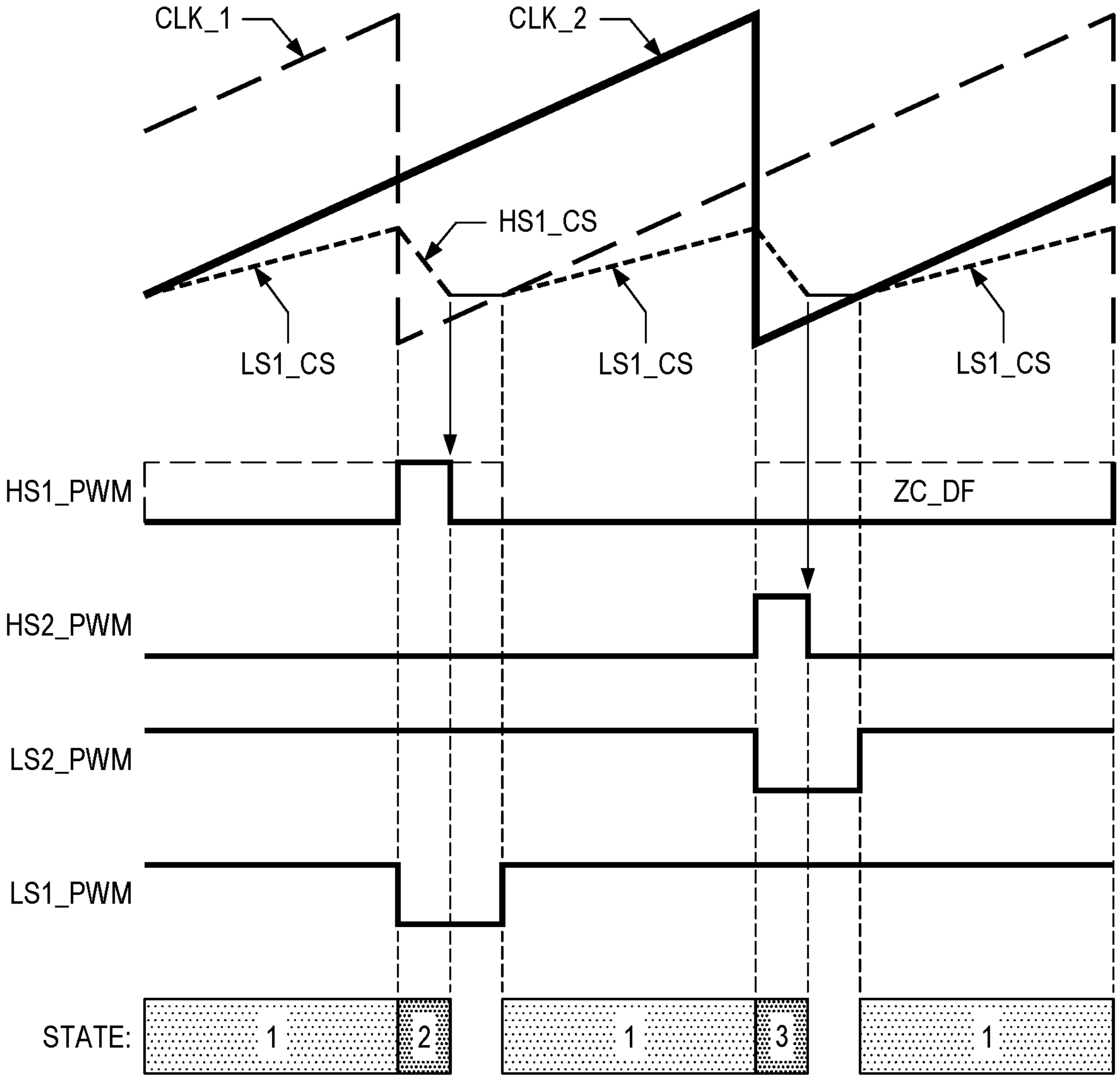
FIG. 5 is a timing diagram illustrating example operation of the three-level boost converter of FIG. 2 in discontinuous conduction mode (DCM) with a low input voltage.

FIG. 5 is a timing diagram illustrating example operation of the three-level boost converter 200 in DCM with a low input voltage. FIG. 5 shows the clock signals CLK_1 and CLK_2, the current sense signals HS1_CS and LS1_CS, and the transistor control signals HS1_PWM, HS2_PWM, LS1_PWM, and LS2_PWM. The transistor control signals HS1_PWM, HS2_PWM, LS1_PWM, and LS2_PWM control turn on/off of the transistors 206, 208, 210, and 212 respectively. FIG. 5 also shows the zero current differentiation zone (ZC_DF) defined by the signal VZC_DF generated by the valley/zero current differentiation zone circuit 232. The ZC_DF defines a time interval for use in DCM during which the transistor 206 and the transistor 208 are turned off with different timing than in CCM. The ZC_DF is active (e.g., VZC_DF is a logic one) from the falling edge of CLK_2 until LS1_ON is set to a logic one (LS1_PWM is set to a logic one and the transistor 212 is turned on) as shown in FIG. 5.

At the falling edge of CLK_1, (initiation of state 2) the high-side on circuit 238 sets HS1_ON to a logic one, which sets HS1_PWM to a logic one, and turns on the transistor 206. Similarly, at the falling edge of CLK_1, the low-side off circuit 244 sets LS1_OFF to a logic one, which sets LS1_PWM to a logic zero, and turns off the transistor 212. When the current flowing through the transistor 206 is zero (detected by the zero current detection circuit 226) in the zero current differentiation zone, the DCM control circuit 234 sets HS1_DCM_OFF to a logic one. Based on HS1_DCM_OFF, the high-side off circuit 240 sets HS1_OFF to a logic one, which sets HS1_PWM to a logic zero, and turns off transistor 206. In contrast, in CCM, the transistor 206 may remain on until HS1_CS is equal to CLK_1. When HS1_CS is equal to CLK_1 (initiation of state 1 after state 2), the low-side on circuit 242 sets LS1_ON to a logic one, which sets LS1_PWM to a logic one and turns on the transistor 212.

At the falling edge of CLK_2, (initiation of state 3) the high-side on circuit 238 sets HS2_ON to a logic one, which sets HS2_PWM to a logic one, and turns on the transistor 208. Similarly, at the falling edge of CLK_2, the low-side off circuit 244 sets LS2_OFF to a logic one, which sets LS2_PWM to a logic zero, and turns off the transistor 210. The falling edge of CLK_2 initiates the zero current differentiation zone, and when the current flowing through the transistor 212 is zero (detected by the zero current detection circuit 228), the DCM control circuit 234 sets HS2_DCM_OFF to a logic one. Based on HS2_DCM_OFF, the high-side off circuit 240 sets HS2_OFF to a logic one, which sets HS2_PWM to a logic zero, and turns off transistor 208. In contrast, in CCM, the transistor 208 may remain on until LS1_CS is equal to CLK_2. When LS1_CS is equal to CLK_2 (initiation of state 1 after state 3), the low-side on circuit 242 sets LS2_ON to a logic one, which sets LS2_PWM to a logic one and turns on the transistor 210.

Accordingly, in DCM, with a low input voltage, the three-level boost converter 200 transitions between states as 1, 2, 1, 3, and:

$$ZC\_DF=1 \text{ from the edge of } CLK\_2 \text{ to } LS1\_ON==1; \quad (1)$$

$$HS1\_OFF=(HS1\_CS<CLK\_1)||(HS1\_CS<0)\&\&\ ZC\_DF==1); \text{ and} \quad (2)$$

$$HS2\_OFF=(LS1\_CS<CLK\_2)||(HS1\_CS<CLK\_2)||(LS1\_CS<0)\&\&\ ZC\_DF==1)||(HS1\_CS<0)\&\&\ ZC\_DF==0). \quad (3)$$

Figure 6:
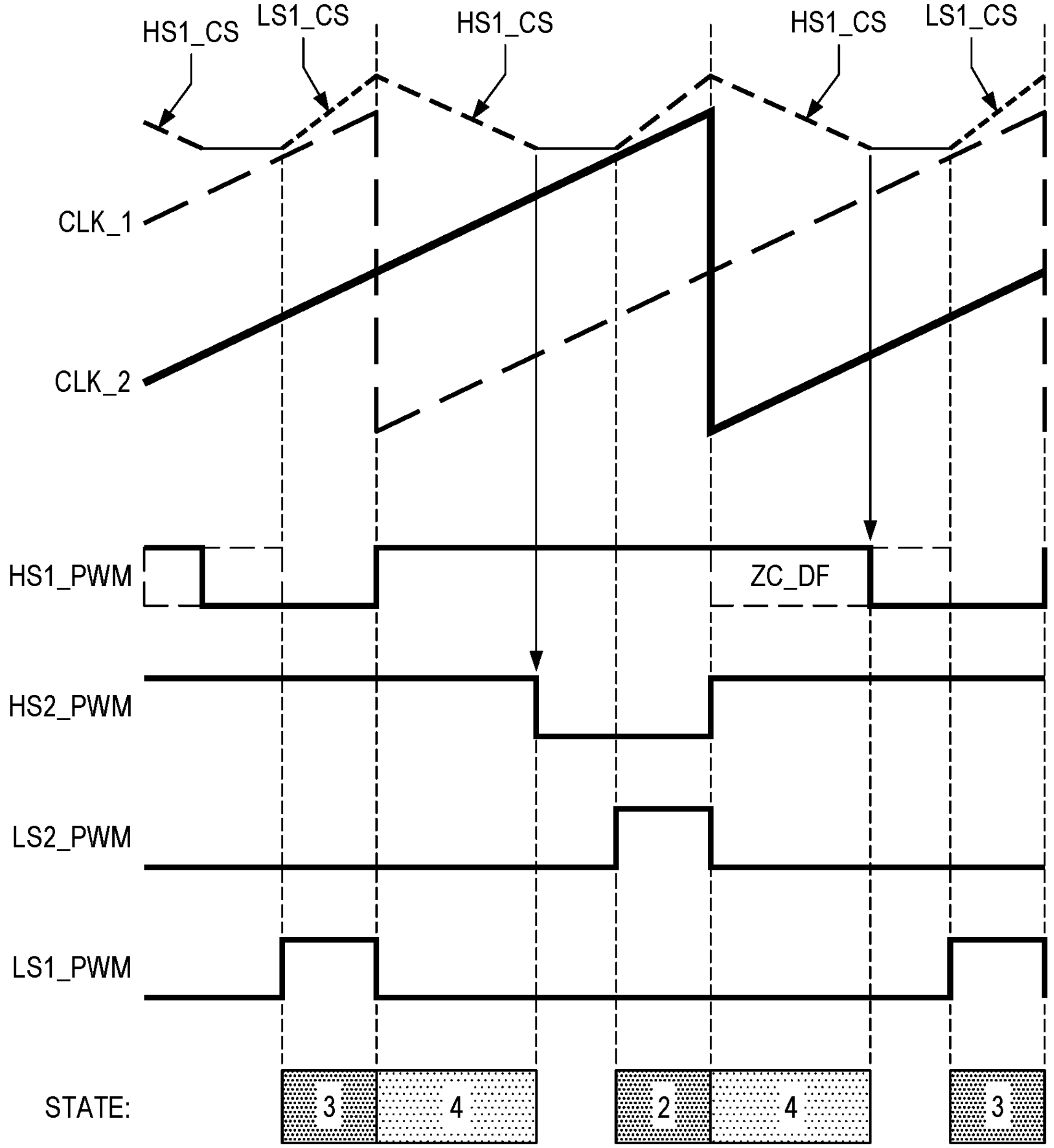
FIG. 6 is a timing diagram illustrating example operation of the three-level boost converter of FIG. 2 in DCM with a high input voltage.

FIG. 6 is a timing diagram illustrating example operation of the three-level boost converter 200 in DCM with a high input voltage. FIG. 6 shows the clock signals CLK_1 and CLK_2, the current sense signals HS1_CS and LS1_CS, and the transistor control signals HS1_PWM, HS2_PWM, LS1_PWM, and LS2_PWM. The transistor control signals HS1_PWM, HS2_PWM, LS1_PWM, and LS2_PWM control turn on/off of the transistors 206, 208, 210, and 212 respectively. FIG. 6 also shows the zero current differentiation zone (ZC_DF) defined by the signal VZC_DF generated by the valley/zero current differentiation zone circuit 232. The ZC_DF is active (e.g., VZC_DF is a logic one) from the falling edge of CLK_2 until LS1_ON is set to a logic one (the transistor 212 is turned on) as shown in FIG. 6. The operations illustrated in FIG. 6 are in accordance with equations (1)-(3).

At the falling edge of CLK_1, (initiation of state 4 after state 3) the high-side on circuit 238 sets HS1_ON to a logic one, which sets HS1_PWM to a logic one, and turns on the transistor 206. Additionally, at the falling edge of CLK_1, the low-side off circuit 244 sets LS1_OFF to a logic one, which sets LS1_PWM to a logic zero, and turns off the transistor 212. After the falling edge of CLK_1, the three-level boost converter 200 is not operating in the zero current differentiation zone, and when the current flowing through the transistor 206 is zero, the transistor 206 is not turned off. However, HS2_DCM_OFF is set to a logic one when the current flowing through the transistor 206 is zero, which sets HS2_OFF to a logic one and HS2_PWM to a logic zero turning off the transistor 208.

When HS1_CS is equal to CLK_2 (initiation of state 2 after state 4), the low-side on circuit 242 sets LS2_ON to a logic one, which sets LS2_PWM to a logic one and turns on the transistor 210. At the falling edge of CLK_2 (initiation of state 4 after state 2), the high-side on circuit 238 sets HS2_ON to a logic one, which sets HS2_PWM to a logic one, and turns on the transistor 208. Additionally, at the falling edge of CLK_2, the low-side off circuit 244 sets LS2_OFF to a logic one, which sets LS2_PWM to a logic zero, and turns off the transistor 210. The falling edge of CLK_2 initiates the zero current differentiation zone.

When HS1_CS is equal to zero (after the falling edge of CLK_2), in the zero current differentiation zone, the DCM control circuit 234 sets HS_1_DCM_OFF to a logic one, which sets HS1_OFF to a logic one and HS1_PWM to a logic zero, turning off the transistor 206. When HS1_CS is equal to CLK_1 (initiation of state 3 after state 4), the low-side on circuit 242 sets LS1_ON to a logic one, which sets LS1_PWM to a logic one and turns on the transistor 212.

Figure 7:
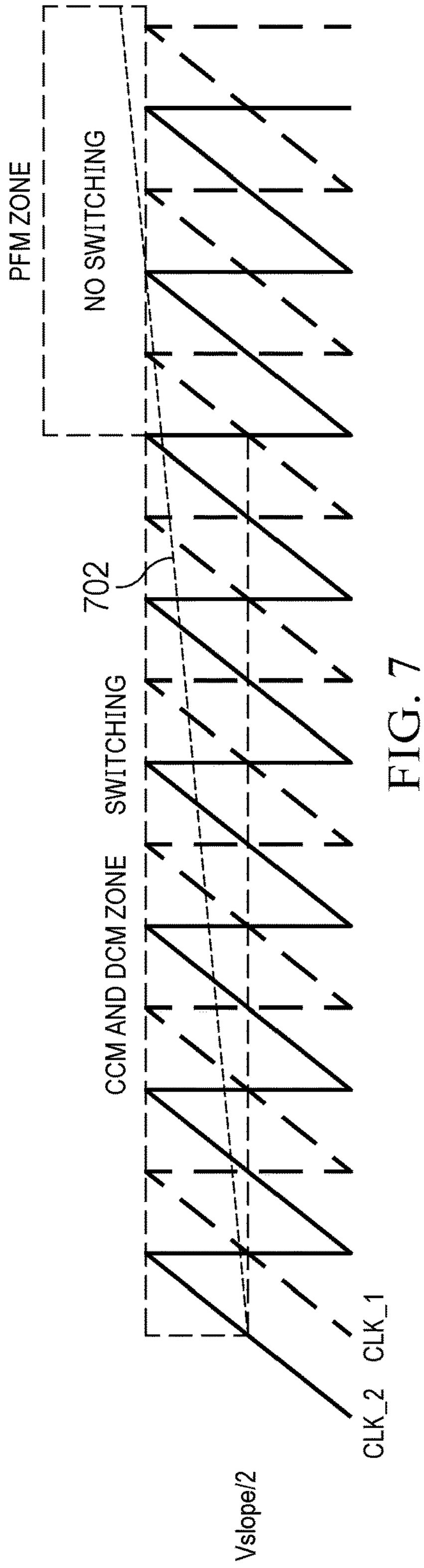
FIG. 7 is a timing diagram illustrating example operation of the three-level boost converter of FIG. 2 transitioning to pulse frequency modulation (PFM) mode with high input voltage.

FIG. 7 is a timing diagram illustrating example operation of the three-level boost converter 200 transitioning to PFM mode with high input voltage. FIG. 7 shows the clock signals CLK_1 and CLK_2, and a line 702 representing sensed current as the output current of the three-level boost converter 200 decreases (e.g., as the current flowing through a load coupled to the three-level boost converter 200 decreases). FIG. 7 shows that as the current sourced by the three-level boost converter 200 decreases the three-level boost converter 200 transitions from operation in CCM or DCM directly to PFM. In CCM and DCM the sensed current intersects CLK_1 and CLK_2, and the three-level boost converter 200 switches the transistors 206, 208, 210, and transistor 212 as shown in FIGS. 3-6. In PFM mode, the sensed current does not intersect CLK_1 or CLK_2, and there is no switching of the transistors 206, 208, 210, and 212 based on such intersection.

Figure 8:
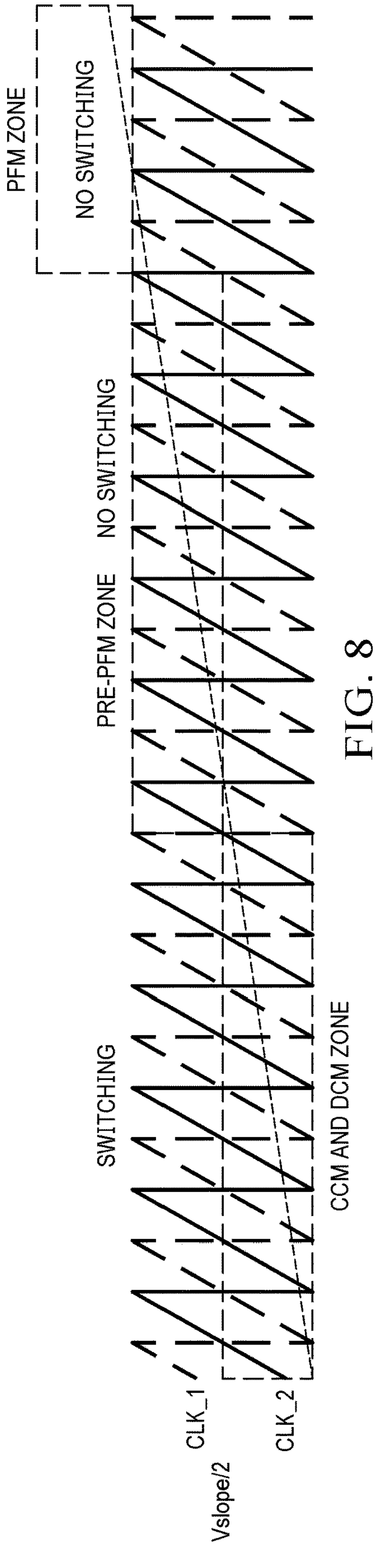
FIG. 8 is a timing diagram illustrating example operation of the three-level boost converter of FIG. 2 transitioning to PFM mode with low input voltage.

FIG. 8 is a timing diagram illustrating example operation of the three-level boost converter 200 transitioning to PFM mode with low input voltage. FIG. 8 shows the clock signals CLK_1 and CLK_2, and a line 802 representing sensed current as the output current of the three-level boost converter 200 decreases (e.g., as the current flowing through a load coupled to the three-level boost converter 200 decreases). FIG. 8 shows that as the current sourced by the three-level boost converter 200 decreases, the three-level boost converter 200 transitions from operation in CCM or DCM to PFM through a pre-PFM zone. In CCM and DCM the sensed current intersects CLK_1 and CLK_2, and the three-level boost converter 200 switches the transistors 206, 208, 210, and 212 as shown in FIGS. 3-6. In the pre-PFM zone, the sensed current also intersects CLK_1 and CLK_2, however, switching in the pre-PFM zone can result in undesirable state transitions. For example, the three-level boost converter 200 may turn on the transistor 206 and the transistor 208 in state 4, which is undesirable when operating with a low input voltage.

In the three-level boost converter 200, the PFM control circuit 236 identifies operation in the pre-PFM zone, and disables switching of the transistors 206, 208, 210, and 212 based on comparison of the sensed current to CLK_1 and CLK_2.

Figure 9:
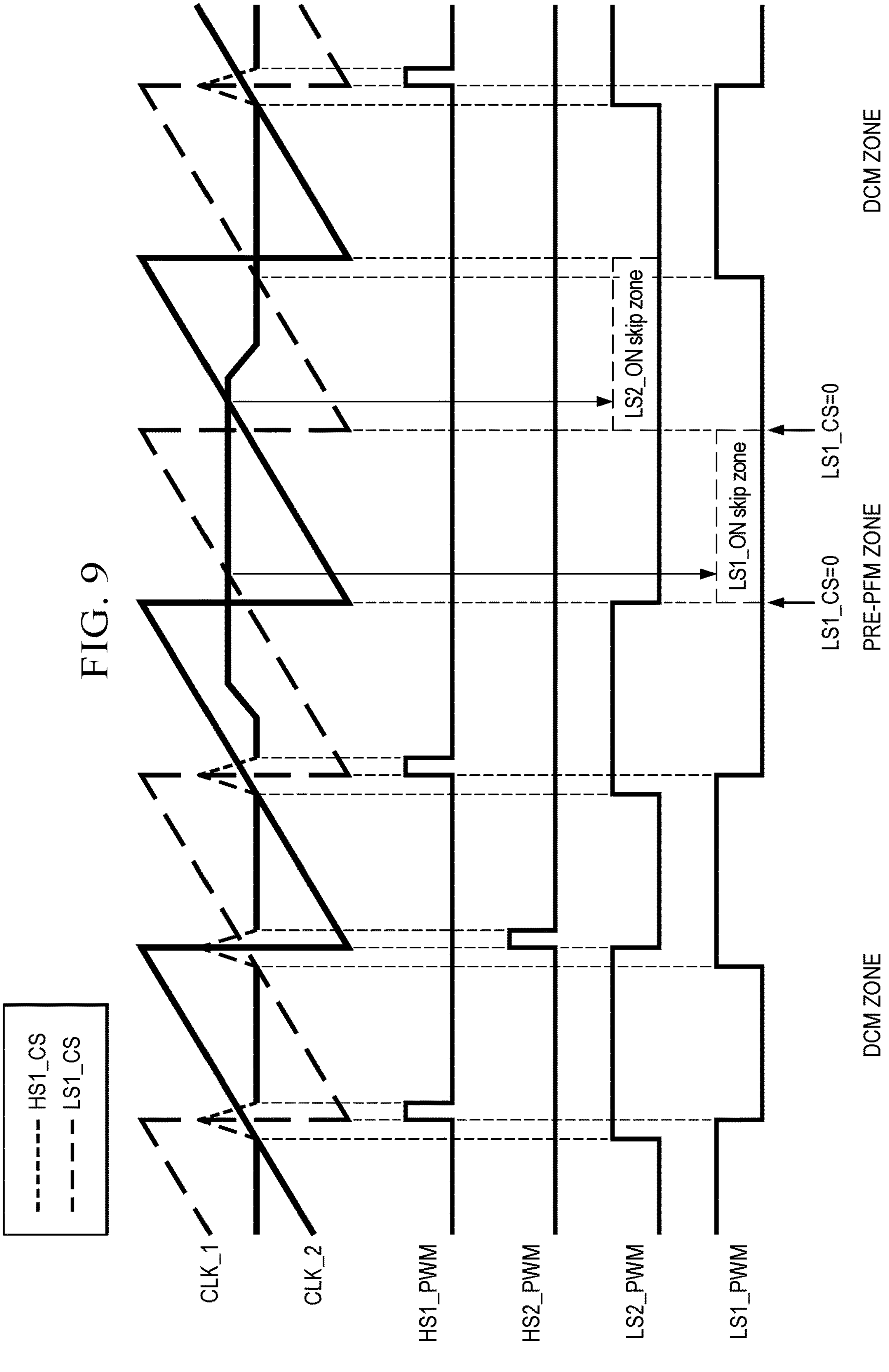
FIG. 9 is a timing diagram illustrating example operation of the three-level boost converter of FIG. 2 in a pre-PFM zone while transitioning to PFM mode with low input voltage.

FIG. 9 is a timing diagram illustrating example operation of the three-level boost converter 200 in the pre-PFM zone. FIG. 9 shows the clock signals CLK_1 and CLK_2, the current sense signals HS1_CS and LS1_CS, and the transistor control signals HS1_PWM, HS2_PWM, LS1_PWM, and LS2_PWM. The transistor control signals HS1_PWM, HS2_PWM, LS1_PWM, and LS2_PWM control turn on/off of the transistors 206, 208, 210, and 212 respectively. FIG. 9 also shows the LS1_ON_SKIP_ZONE defined by the signal LS1_ON_SKIP generated by the PFM control circuit 236 and the LS2_ON_SKIP_ZONE defined by the signal LS2_ON_SKIP generated by the PFM control circuit 236.

The PFM control circuit 236 identifies the pre-PFM zone based on sensed current LS1_CS at the edge of CLK_1 or CLK_2. The three-level boost converter 200 is operating in the pre-PFM zone if LS1_CS is zero at the falling edge of CLK_2. if LS1_CS is zero at the falling edge of CLK_2, the PFM control circuit 236 defines an LS1_ON_SKIP_ZONE as beginning at the edge of CLK_2 and ending at the edge of CLK_1. Similarly, the three-level boost converter 200 is operating in the pre-PFM zone if LS1_CS is zero at the falling edge of CLK_1. if LS1_CS is zero at the falling edge of CLK_1, the PFM control circuit 236 defines an LS2_ON_SKIP_ZONE as beginning at the edge of CLK_1 and ending at the edge of CLK_2. In the LS1_ON_SKIP_ZONE, the low-side on circuit 242 disables generation of LS1_ON and turn on of the transistor 212. In the LS2_ON_SKIP_ZONE, the low-side on circuit 242 disables generation of LS2_ON and turn on of the transistor 210. The pre-PFM zone may be defined as LS1_ON_SKIP_ZONE or LS2_ON_SKIP_ZONE.

Additionally, the high-side on circuit 238 disables generation of HS1_ON and HS2_ON (disables turn on the transistor 206 and the transistor 208) if LS1_ON and LS2_ON are logic zero.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET)) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:

first, second, third, and fourth transistors coupled in series; and a control circuit coupled to the first, second, third, and fourth transistors, the control circuit including a clock generator, a current sense circuit, and a zero current differentiation zone (ZC_DF) circuit, in which:

the clock generator is configured to generate first and second clocks, in which the second clock is in quadrature with the first clock;

the current sense circuit is configured to sense a current flowing through the first transistor;

the ZC_DF circuit is configured to define a ZC_DF interval starting at an edge of the second clock and ending at turn-on of the fourth transistor; and the control circuit is configured to operate the first, second, third, and fourth transistors in a discontinuous conduction mode (DCM), and, in the DCM, turn off the first transistor during the ZC_DF interval responsive to the current flowing through the first transistor being negative.

2. The circuit of claim 1, wherein:

the current sense circuit is a first current sense circuit;

the control circuit include a second current sense circuit configured to detect a current flowing through the fourth transistor; and the control circuit is configured to, in the DCM, turn off the second transistor during the ZC_DF interval responsive to the current flowing through the fourth transistor being negative.

3. The circuit of claim 2, wherein the control circuit is configured to, in DCM, turn off the second transistor, not in the ZC_DF interval, responsive to the current flowing through the first transistor being negative.

4. The circuit of claim 2, wherein:

the first current sense circuit is configured to generate a first sense signal representing the current flowing through the first transistor;

the second current sense circuit is configured to generate a second sense signal representing the current flowing through the fourth transistor; and the control circuit is configured to turn off the second transistor responsive to the first sense signal being less than the second clock, or the second sense signal being less than the second clock.

5. The circuit of claim 1, wherein:

the current sense circuit is configured to generate a sense signal representing the current flowing through the first transistor; and the control circuit is configured to turn off the first transistor responsive to the sense signal being less than the first clock.

6. The circuit of claim 1, wherein the control circuit is configured to:

operate the first, second, third, and fourth transistors in a pulse frequency modulation (PFM) mode;

define a pre-PFM zone based on the current flowing through the fourth transistor being zero at an edge of the second clock; and in the pre-PFM zone:

disable turn-on of the fourth transistor; and exit the pre-PFM zone responsive to the current flowing through the fourth transistor not being zero at an edge of the second clock.

7. The circuit of claim 6, wherein the control circuit is configured to:

define the pre-PFM zone based on the current flowing through the fourth transistor being zero at an edge of the first clock;

in the pre-PFM zone:

disable turn-on of the third transistor; and exit the pre-PFM zone responsive to the current flowing through the fourth transistor not being zero at an edge of the first clock.

8. The circuit of claim 6, wherein the control circuit is configured to:

in the pre-PFM zone: disable turn-on of the first transistor and the second transistor based on turn-on of the third and fourth transistors being disabled.

9. A circuit comprising:

first, second, third, and fourth transistors coupled in series; and a control circuit coupled to the first, second, third, and fourth transistor, the control circuit including a clock generator, a first current sense circuit, and a second current sense circuit, in which:

the clock generator is configured to generate first and second clocks, in which the second clock is in quadrature with the first clock;

the first current sense circuit is configured to sense a current flowing through the first transistor;

the second current sense circuit is configured to sense a current flowing through the fourth transistor; and the control circuit is configured to:

operate the first, second, third, and fourth transistors in a pulse frequency modulation (PFM) mode;

define a pre-PFM zone based on the current flowing through the fourth transistor being zero at an edge of the second clock; and in the pre-PFM zone:

disable turn-on of the fourth transistor; and exit the pre-PFM zone responsive to the current flowing through the fourth transistor not being zero at an edge of the second clock.

10. The circuit of claim 9, wherein the control circuit is configured to:

define the pre-PFM zone based on the current flowing through the fourth transistor being zero at an edge of the first clock;

in the pre-PFM zone:

disable turn-on of the third transistor; and exit the pre-PFM zone responsive to the current flowing through the fourth transistor not being zero at an edge of the first clock.

11. The circuit of claim 9, wherein the control circuit is configured to:

in the pre-PFM zone: disable turn-on of the first transistor and the second transistor based on turn-on of the third and fourth transistors being disabled.

12. The circuit of claim 9, wherein:

the control circuit includes:

a zero current differentiation zone (ZC_DF) circuit configured to define a ZC_DF interval starting at an edge of the second clock and ending at turn-on of the fourth transistor; and the control circuit is configured to operate the first, second, third, and fourth transistors in a discontinuous conduction mode (DCM), and, in the DCM, turn off the first transistor during the ZC_DF interval responsive to the current flowing through the first transistor being negative.

13. The circuit of claim 12, wherein the control circuit is configured to, in DCM, turn off the second transistor during the ZC_DF interval responsive to the current flowing through the fourth transistor being negative.

14. The circuit of claim 13, wherein the control circuit is configured to, in the DCM, turn off the second transistor, not in the ZC_DF interval, responsive to the current flowing through the first transistor being negative.

15. The circuit of claim 13, wherein:

the first current sense circuit is configured to generate a first sense signal representing the current flowing through the first transistor;

the second current sense circuit is configured to generate a second sense signal representing the current flowing through the fourth transistor; and the control circuit is configured to turn off the second transistor responsive to the first sense signal being less than the second clock, or the second sense signal being less than the second clock.

16. The circuit of claim 13, wherein:

The first current sense circuit is configured to generate a sense signal representing the current flowing through the first transistor; and the control circuit is configured to turn off the first transistor responsive to the sense signal being less than the first clock.

17. A backlight system comprising:

a light emitting diode (LED); and a three-level switching converter coupled to the LED, the three-level switching converter including:

first, second, third, and fourth transistors coupled in series; and a control circuit coupled to the first, second, third, and fourth transistors, the control circuit including a clock generator, a first current sense circuit, a second current sense circuit, and a zero current differentiation zone (ZC_DF) circuit, in which:

the clock generator is configured to generate first and second clocks, in which the second clock is in quadrature with the first clock;

the first current sense circuit is configured to sense a current flowing through the first transistor;

the ZC_DF circuit is configured to define a ZC_DF interval starting at an edge of the second clock and ending at turn-on of the fourth transistor; and the control circuit is configured to operate the first, second, third, and fourth transistors in a discontinuous conduction mode (DCM), and, in the DCM:
turn off the first transistor during the ZC_DF interval responsive to the current flowing through the first transistor being negative; and
turn off the second transistor during the ZC_DF interval responsive to the current flowing through the fourth transistor being negative.

18. The backlight system of claim 17, wherein the control circuit is configured to, in the DCM, turn off the second transistor, not in the ZC_DF interval, responsive to the current flowing through the first transistor being negative.

19. The backlight system of claim 17, wherein:
the first current sense circuit is configured to generate a first sense signal representing the current flowing through the first transistor;
the second current sense circuit is configured to generate a second sense signal representing the current flowing through the fourth transistor;
the control circuit is configured to:
turn off the second transistor responsive to the first sense signal being less than the second clock, or the second sense signal being less than the second clock; and
turn off the first transistor responsive to the first sense signal being less than the first clock.

20. The backlight system of claim 17, wherein the control circuit is configured to:
operate the first, second, third, and fourth transistors in a pulse frequency modulation (PFM) mode;
define a pre-PFM zone based on the current flowing through the fourth transistor being zero at an edge of the second clock or the current flowing through the fourth transistor being zero at an edge of the first clock; and
in the pre-PFM zone:
disable turn-on of the fourth transistor;
responsive to initiation of the pre-PFM zone at the current flowing through the fourth transistor being zero at an edge of the second clock, exit the pre-PFM zone responsive to the current flowing through the fourth transistor not being zero at an edge of the second clock;
disable turn-on of the third transistor;
responsive to initiation of the pre-PFM zone at the current flowing through the fourth transistor being zero at an edge of the first clock, exit the pre-PFM zone responsive to the current flowing through the fourth transistor not being zero at an edge of the first clock; and
disable turn-on of the first transistor and the second transistor based on turn-on of the third and fourth transistors being disabled.

* * * * *